United States Patent [19]

Bergsman et al.

[11] Patent Number: 5,568,539
[45] Date of Patent: Oct. 22, 1996

[54] INTERACTIVE TELEPHONIC MESSAGE DELIVERY METHOD AND APPARATUS FOR PROVIDING AN INTENDED RECIPIENT OF A VOICE AUDIO MESSAGE WITH OPTIONS AS TO WHEN HE OR SHE WILL HEAR THE MESSAGE

[75] Inventors: Barry Bergsman, Los Angeles; Curtis Pearlman, Westlake Village, both of Calif.

[73] Assignee: Intertel Communications, Inc., Los Angeles, Calif.

[21] Appl. No.: 395,898

[22] Filed: Feb. 28, 1995

[51] Int. Cl.⁶ .................................................. H04M 1/64
[52] U.S. Cl. .................................. 379/67; 379/77
[58] Field of Search ............................ 379/67, 69, 74, 379/77, 89, 88, 72

[56] References Cited

U.S. PATENT DOCUMENTS

| | | | |
|---|---|---|---|
| 4,580,012 | 1/1986 | Matthews et al. | 379/198 |
| 5,247,568 | 11/1993 | Bergsman et al. | 379/67 |
| 5,313,516 | 5/1994 | Afshar et al. | 379/69 |
| 5,329,578 | 7/1994 | Brennan et al. | 379/67 |
| 5,333,180 | 7/1994 | Brown et al. | 379/89 |

FOREIGN PATENT DOCUMENTS

| | | | |
|---|---|---|---|
| 63-267049 | 11/1988 | Japan | 379/69 |

OTHER PUBLICATIONS

"OCTEL User Reference Manual", OCTEL Communications Corporation, Version 2, Nov. 1994.

*Primary Examiner*—Krista M. Zele
*Assistant Examiner*—Daniel S. Hunter
*Attorney, Agent, or Firm*—Blakely Sokoloff Taylor & Zafman

[57] ABSTRACT

An interactive telephonic message delivery method and apparatus for providing an intended recipient of a voice message with options as to when the intended recipient will hear the message. Initially, the recipient of the voice mail is directed to indicate that he or she has a touch-tone telephone by generating a recognizable tone through pressing any one of the telephone touch-tone buttons. If the recipient does not generate a recognizable tone before the expiration of a predetermined amount of time, the recipient is informed of a telephone number to dial at a later time from a touch-tone telephone in order to retrieve the message. On the other hand, if the recipient indicates that he or she possesses a touch-tone telephone (i.e., if the recipient generates a recognizable tone), the recipient is then provided with a number of options for processing the message. The recipient then selects particular options by pressing the telephone buttons associated with the particular options.

15 Claims, 3 Drawing Sheets

INTERACTIVE TELEPHONIC MESSAGE DELIVERY METHOD AND APPARATUS FOR PROVIDING AN INTENDED RECIPIENT OF A VOICE AUDIO MESSAGE WITH OPTIONS AS TO WHEN HE OR SHE WILL HEAR THE MESSAGE

BACKGROUND OF THE INVENTION

1. Field of the Invention

The present invention relates to the field of telephonic audio message systems, and particularly to an interactive telephonic message delivery method and apparatus for providing the intended recipient of a voice audio message with options as to when he or she will hear the message.

2. Description of the Related Art

Currently, there exist a number of interactive voice message systems which enable a caller utilizing a touch-tone telephone to store a telephonic audio message and to direct this message to a particular recipient at a specified phone number, date, and time. More specifically, in these interactive voice message systems, a call record is originally created by a caller who dials into the system and records an audio message. In addition, some prior art interactive voice message systems allow a caller to incorporate his or her personal message into a pre-recorded message, which the caller selects from a particular message list.

The caller then conveys (1) the name of the intended recipient of the message (e.g., chooses the recipient's name from a spoken list of pre-defined names), (2) the phone number of the intended recipient, and (3) the date and time for the system to call the recipient and to deliver the message. The interactive voice message system then stores the telephonic voice message and links this message to an administrative call record which is stored in a message delivery database in the system. One example of a prior art method for creating and composing voice messages is disclosed by U.S. Pat. No. 5,146,487 issued to Bergsman et al.

By examining the administrative call record, prior art interactive voice message systems contact the intended recipient of the message by dialing the stored telephone number at the appointed date and time, in order to deliver the message. Unfortunately, these prior art interactive audio message systems do not provide the recipient of the voice mail with options as to when he or she wish to hear his or her message. Consequently, these prior art telephonic audio message storage and delivery systems force the recipient of the message to receive the message at a predetermined time and place, irrespective of the recipient's desires or needs. Therefore, there is a need in the prior art for an interactive telephonic message delivery method and apparatus for providing an intended recipient of a voice message with options as to when he or she will hear the message.

SUMMARY OF THE INVENTION

The present invention is an interactive telephonic message delivery method and apparatus for providing an intended recipient of a voice message with options as to when he or she will hear the message. In one embodiment of the present invention, the interactive telephonic message delivery system initially contacts the intended recipient of the audio message at an initial appointed date and time. The recipient of the voice mail is then directed to indicate that he or she has a touch-tone telephone by generating a recognizable tone through pressing any one of the telephone touch-tone buttons. If the recipient does not generate a recognizable tone before the expiration of a first predetermined amount of time, the system terminates the call after informing the recipient of a telephone number to dial at a later time from a touch-tone telephone in order to retrieve the message. On the other hand, if the recipient indicates that he or she possesses a touch-tone telephone (i.e., if the recipient generates a recognizable tone), the recipient is then provided with a number of options for processing the message (e.g., the recipient is provided with a number of options as to when he or she wishes to hear the message). The recipient then selects particular options by pressing the telephone buttons associated with the particular options.

For example, in one embodiment of the present invention, the recipient receives the following instructions: (1) press a first button to retrieve the pending message immediately, (2) press a second button to receive a telephone number to use at a more convenient time in order to retrieve the pending message, and (3) press a third button to end the session immediately and cause the system to call back within a second predetermined amount of time.

If the recipient presses the first button, the system delivers the pending message immediately, marks the call record to reflect that the message has been delivered, and ends the session accordingly. However, if the recipient presses the second button, the message delivery system (1) informs the recipient of the telephone number to use at a more convenient time in order to retrieve the pending message, and (2) provides the recipient with a number of instructions to follow when calling back into the system to retrieve the pending message. In addition, the system marks the call record appropriately so that the message will not be processed by the message delivery system until the recipient calls the system to retrieve the pending message.

Finally, if the recipient selects the third button, the system ends the session immediately and marks the call record in the system database to reflect the event that took place. The record now contains a new message delivery date and time corresponding to the initial appointed date and time plus the second predetermined amount of time. The system then places the pending message back in the message delivery queue for the system to fetch and process at the new date and time.

BRIEF DESCRIPTION OF THE DRAWINGS

The objects, features, and advantages of the present invention will be apparent from the following detailed description, in which.

DETAILED DESCRIPTION OF THE INVENTION

The present invention is an interactive telephonic message delivery method and apparatus for providing an intended recipient of a telephonic voice message with options as to when he or she will hear the message. After a caller utilizes any one of the prior art methods for creating and composing audio voice messages (such as the method disclosed by U.S. Pat. No. 5,146,487 issued to Bergsman et al.) to compose and store a message for delivery to a particular recipient at a specified phone number, date, and time, the interactive message delivery system of the present invention contacts the intended recipient and provides him or her with a number of options for processing the message (e.g., provides the recipient with a number of options as to when he or she wishes to hear the message). A more detailed description of the invention is provided by way of reference to the following exemplary embodiments of the present invention that are set forth in FIGS. 1–3.

Figure 1:
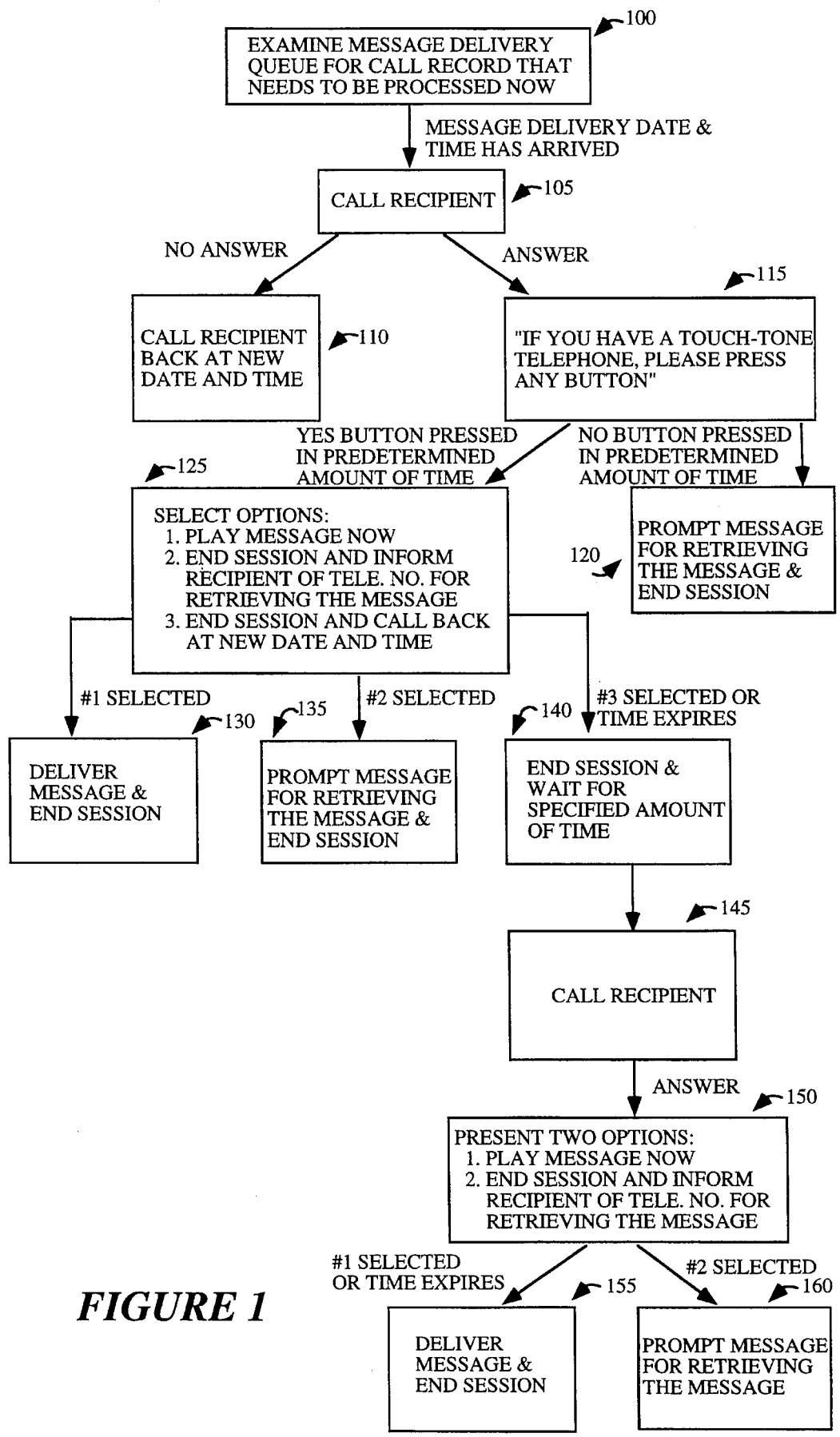
FIG. 1 presents a flow diagram showing the steps performed by one embodiment of the present invention.

Referring first to FIG. 1, at step 100, the message delivery system of the present invention examines a message delivery queue (which in one embodiment of the present invention is stored in a message delivery database) for a call record of a recorded voice message whose appointed message delivery date and time has arrived. If the message delivery system encounters such a call record, the system then at step 105 initiates the processing of the recorded message associated with this call record by dialing the recipient's telephone number, which is stored within the call record. If the telephone call is not answered within a predetermined amount of time (e.g., within thirty seconds), the system at step 110 ends the message delivery session and changes the call record in the system database to reflect the event that took place and to reflect a new message delivery date and time corresponding to the initial appointed date and time plus a predetermined amount of time (e.g., an hour). The system then places the call record of the pending message back in the message delivery queue so that the system can fetch and process the pending message at the new message delivery date and time.

However, if the telephone call is answered, the message delivery system then at step 115 ascertains if the recipient's telephone equipment is of a rotary dial or touch-tone nature, because the present invention's message delivery method requires the recipient to be able to control his or her experience by way of generating recognizable tones. The system obtains this information by asking the person answering the telephone call to generate a recognizable tone by pressing a button on the touch-tone telephone.

If the message delivery system does not receive a recognizable tone within a predetermined time interval (e.g., within thirty seconds), the system then at step 120 informs the recipient of a toll-free number that he or she may use at a more convenient time in order to retrieve the pending message by using a touch-tone telephone. The system also provides the recipient with a number of instructions to follow when calling back into the system to retrieve the message with the touch-tone telephone. For example, the system instructs the recipient to enter an identification code, for the call record associated with the pending message, when calling back into the system to retrieve the message.

Furthermore, at step 120, the message delivery system marks the call record appropriately so that the message will not be placed back in the message delivery queue again (i.e., so that the system will not initiate delivery of the message again by contacting the recipient). More specifically, at step 120, the message delivery system changes the call record to reflect that the message will be retrieved and processed at such time that the recipient undertakes the overt action of calling the system and entering the identification code for the call record.

On the other hand, if the message delivery system does receive a recognizable tone within the predetermined amount of time (e.g., within thirty seconds), the system at step 125 realizes that the recipient can utilize his or her phone equipment to control his or her activities for the remainder of the session. To ascertain if the intended recipient of the message is present at the location dialed and if the recipient presently wishes to receive the message, the message delivery system then at step 125 offers the recipient a predetermined amount of time (e.g., twenty seconds) to choose among a number of options regarding the receipt of the pending message.

For example, for the embodiment of the present invention shown in FIG. 1, the message delivery system offers the recipient twenty seconds to choose one of three options regarding the receipt of the pending message. In this embodiment, the recipient is told that during the subsequent twenty seconds the recipient may (1) press a first touch-tone button (e.g., button "1") of the touch-tone telephone to retrieve the pending message immediately, (2) press a second touch-tone button (e.g., button "8") of the telephone to cause the system to inform the recipient of a toll-free number that he or she may use at a more convenient time in order to retrieve the pending message from a touch-tone telephone, and (3) press a third touch-tone button (e.g., button "5") to end the session immediately and cause the system to call back in a predetermined amount of time (e.g., in five minutes).

If the user presses the first button, the system at step 130 delivers the pending message immediately, marks the call record to reflect that the message has been delivered, and ends the session accordingly. On the other hand, if the recipient presses the second button, the system at step 135 marks the call record appropriately so that the message will not be placed back in the message delivery queue to be processed again by the message delivery system (i.e., so that the system will not initiate delivery of the message again by contacting the recipient). In other words, after the recipient selects the second option, the updated call record reflects that the message will be retrieved and processed at such time that the recipient calls the system and enters an identification code for the call record associated with the pending message. The recipient then receives a message which informs him or her of the appropriate phone number to use and instructions to follow (such as entering the identification code to enter) when calling back into the system to retrieve the pending message.

Alternatively, if the recipient presses the third button, the system at step 140 ends the session immediately and changes the call record (in the system database) to reflect the event that took place and to indicate a new message delivery date and time corresponding to the original appointed date and time plus the predetermined amount of time (e.g., five minutes). In addition, if the recipient does not press any buttons within a predetermined amount of time (e.g., within twenty seconds) after he or she has been presented with the three options at step 125, the system behaves essentially as if the recipient had chosen the third option (i.e., as if the recipient had pressed the third button), with the exception that the system marks the record to reflect the exact nature of the event that took place, as opposed to the event associated with the recipient actually choosing the third option overtly. The system then idles in step 140 until the new message delivery date and time has arrived.

At the new message delivery date and time, the message delivery system then transitions to step 145 during which it calls back the recipient. If the telephone call is not answered within a predetermined amount of time (e.g. within thirty seconds), the system remains at step 145, where it periodically re-attempts to call the recipient. Once the recipient answers the telephone call, the system then transitions to step 150, during which it offers the recipient a predetermined amount of time to choose among a number of options regarding the receipt of the pending message. For example, in the embodiment of the present invention shown in FIG. 1, the recipient is told that during the subsequent twenty seconds the recipient may: (1) press a first touch-tone button (e.g., "1" button) to listen to the pending message immediately, or (2) press a second touch-tone button (e.g., "8" button) to cause the system to inform the caller of a toll-free number that he or she may use at a more convenient time in order to retrieve the pending message with a touch-tone telephone.

If the user selects the first button, the system at step 155 delivers the pending message immediately, marks the call record to reflect that the message has been delivered, and then ends the session. On the other hand, if the recipient presses the second button, the system at step 160 marks the call record appropriately so that it will not be placed back in the message delivery queue again by the message delivery system (i.e., so that the message delivery system will not initiate delivery of the message again by contacting the recipient). In other words, after the recipient selects the second option, the updated record reflects that the message will be retrieved and processed at such time that the recipient calls the system and enters an identification code for the record. The recipient then receives a message informing him or her of the appropriate phone number to use and instructions to follow (such as entering the identification code) when calling back into the system to retrieve the message. If the recipient does not select either of these two options within a predetermined amount of time (e.g., thirty seconds), then the system (1) informs the recipient that the message will be delivered in twenty seconds, and (2) at step 155 delivers the pending message immediately, marks the call record to reflect that the message has been delivered, and then ends the session.

Figure 2:
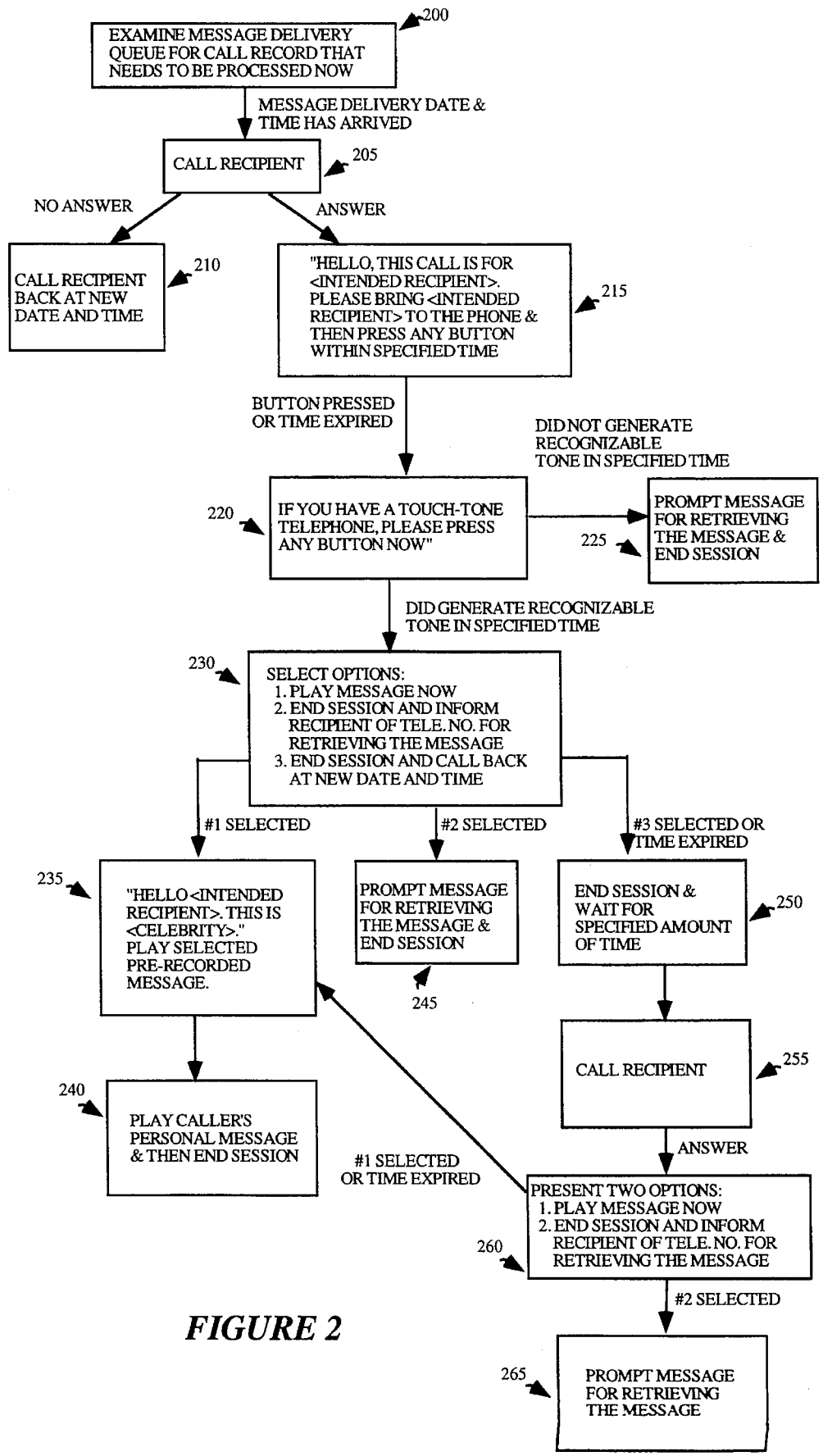
FIG. 2 presents a flow diagram showing the steps performed by another embodiment of the present invention.

FIG. 2 presents a more detailed embodiment of the present invention. At step 200, the message delivery system examines a message delivery queue for a call record of a recorded voice message whose appointed message delivery date and time has arrived. If the message delivery system encounters such a call record, the system then at step 205 initiates processing the recorded message (associated with the call record) by dialing the recipient's telephone number, which is stored within the call record. If the telephone call is not answered within a predetermined amount of time, the system at step 210 ends the session and changes the call record (for the message) to reflect the event that took place and to reflect a new message delivery date and time corresponding to the initial appointed date and time plus a predetermined amount of time (e.g., an hour). The system then places the pending message back in the message delivery queue so that the system can fetch and process the pending message at the new message delivery date and time.

However, if the telephone call is answered, the message delivery system then at step 215 informs the person answering the telephone call that the message is for the intended recipient. The message delivery system then asks the person answering the telephone call to give the telephone to the intended recipient and after doing so to press a touch-tone button on the telephone so that the message delivery system can deliver its message. Once a touch-tone button is pressed, the system then transitions to step 220. In addition, for the embodiment of the present invention shown in FIG. 2, the system also transitions from step 215 to step 220 even when no touch-tone telephone button is pressed within a predetermined amount of time (e.g., within thirty seconds). However, it is to be understood that in alternative embodiments of the present invention, if at step 215 no touch-tone button is pressed within the predetermined amount of time (e.g., within thirty seconds), the system terminates the telephone call after informing the person receiving the telephone call of a toll-free number for the recipient to use at a more convenient time to retrieve the pending message.

At step 220, the message delivery system of FIG. 2 ascertains if the recipient's telephone equipment is of a rotary dial or touch-tone nature, by asking the person answering the call to generate a recognizable tone by pressing a button on the touch-tone telephone. If the message delivery system does not receive a recognizable tone within a predetermined time interval (e.g., within thirty seconds), the system then at step 225 informs the recipient of a toll-free number that he or she may use at a more convenient time in order to retrieve the pending message by using a touch-tone telephone. The system also provides the recipient with a number of instruction (such as entering an identification code for the call record associated with the pending message) to follow when calling back into the system to retrieve the message with a touch-tone telephone. The message delivery system then changes the call record appropriately so that the message will not be placed back in the message delivery queue again, but rather will be placed in a message retrieval queue (which in one embodiment of the present invention is stored in the message delivery database) from where it will be retrieved and processed at such time that the recipient calls the system and enters the identification code for the call record.

On the other hand, if the message delivery system does receive a recognizable tone within the predetermined amount of time (e.g., within thirty seconds), the system then at step 230 offers the recipient a predetermined amount of time (e.g., twenty seconds) to choose among a number of options regarding the receipt of the pending message. For example, for the embodiment of the present invention shown in FIG. 2, the message delivery system offers the recipient twenty seconds to choose one of three options regarding the receipt of the pending message. In this embodiment, the recipient is told that during the subsequent twenty seconds the recipient may (1) press a first touch-tone button (e.g., button "1") of the touch-tone telephone to retrieve the pending message immediately, (2) press a second touch-tone button (e.g., button "8") of the telephone to cause the system to inform the recipient of a toll-free number that he or she may use at a more convenient time in order to retrieve the pending message from a touch-tone telephone, and (3) press a third touch-tone button (e.g., button "5") to end the session immediately and cause the system to call back in a predetermined amount of time (e.g., in five minutes).

If the user presses the first button, the system at step 235 then delivers a selected pre-recorded message to the intended recipient. In addition, in one embodiment of the present invention, the intended recipient hears this prerecorded selected message more than once. Furthermore, in another embodiment of the present invention, the number of times that the intended recipient hears this pre-recorded selected message is selected either by the original caller at the time of selecting the pre-recorded message or by the intended recipient at the time of hearing the selected pre-recorded message. The message delivery system then transitions to step 240, during which the message delivery system plays a personal message that the caller recorded for the intended recipient. The message delivery system then marks the call record to reflect that the message has been delivered and then ends the session accordingly.

On the other hand, if the recipient presses the second button, the system at step 245 changes the call record so that the message will not be placed in the message delivery queue to be processed again by the message delivery system, but rather will be placed in the message retrieval queue to be retrieved and processed at such time that the recipient calls the system and enters an identification code for the call record associated with the pending message. The recipient then receives a message which informs him or her of the appropriate phone number to use and instructions to follow (such as entering the identification code) when calling back into the system to retrieve the pending message.

Alternatively, if the recipient presses the third button, the system at step 250 ends the session immediately and changes the call record (in the system database) to reflect the event that took place and to indicate a new message delivery date and time corresponding to the original appointed date and time plus the predetermined amount of time (e.g., five minutes). In addition, if the recipient does not press any buttons within a predetermined amount of time (e.g., within twenty seconds) after he or she has been presented with the three options at step 230, the system behaves essentially as if the recipient had chosen the third option, with the exception that the system marks the call record to reflect the exact nature of the event that took place, as opposed to the event associated with the recipient actually choosing the third option overtly. The system then idles in step 250 until the new message delivery date and time has arrived.

At the new message delivery date and time, the message delivery system then transitions to step 255 during which it calls back the recipient. If the telephone call is not answered within a predetermined amount of time (e.g., within thirty seconds), the system remains at step 255, where it periodically re-attempts to call the recipient. Once the recipient answers the telephone call, the system then transitions to step 260, during which it offer the recipient a predetermined amount of time to choose among the number of options regarding the receipt of the pending message. For example, in one embodiment of the present invention, the recipient is told that during the subsequent twenty seconds the recipient may: (1) press a first touch-tone button (e.g., "1" button) to listen to the pending message immediately, or (2) press a second touch-tone button (e.g., "8" button) to cause the system to inform the caller of a toll-free number that he or she may use at a more convenient time in order to retrieve the pending message with a touch-tone telephone.

If the user selects the first button, the system (1) at step 235 delivers to the recipient the pending pre-recorded message, and (2) at step 240 delivers the caller's personal message to the recipient, changes the call record to reflect that the message has been delivered, and then ends the session. On the other hand, if the recipient presses the second button, the system at step 265 changes the call record appropriately so that it will not be placed back in the message delivery queue again by the message delivery system, but rather will be placed in the message retrieval queue to be retrieved and processed at such time that the recipient calls the system and enters an identification code for the call record. The recipient then receives a message informing him or her of the appropriate phone number to use and instructions to follow when calling back into the system to retrieve the message. If the recipient does not select either of these two options within a predetermined amount of time (e.g., thirty seconds), then the system (1) informs the recipient that the message will be delivered in twenty seconds, and (2) transitions to steps 235 and 240 to deliver the pending message.

Figure 3:
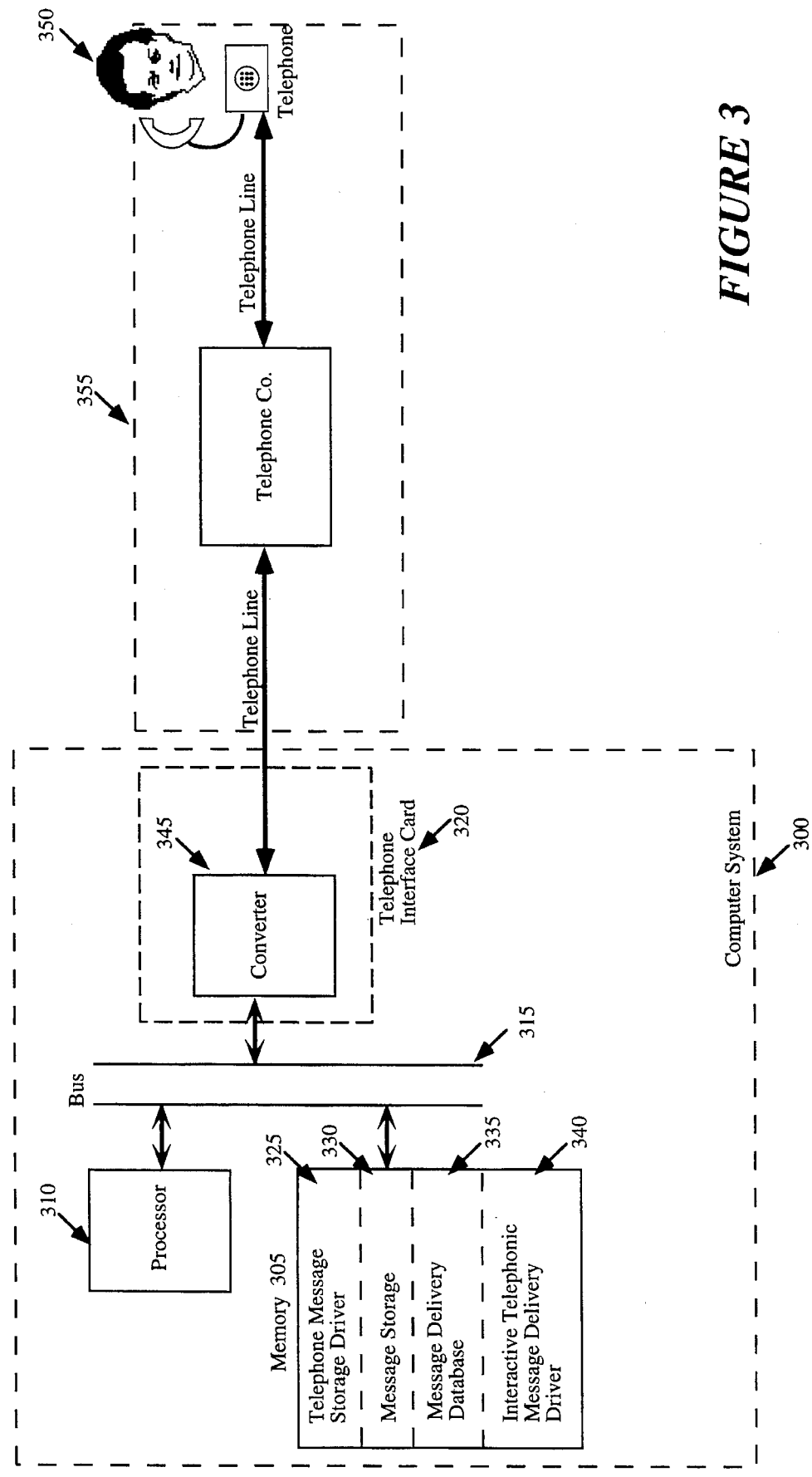
FIG. 3 presents a computer system upon which one of the embodiments of the present invention that are set forth in FIGS. 1 and 2 is implemented.

FIG. 3 presents a computer system upon which one of the embodiments of the present invention that are set forth in FIGS. 1 and 2 is implemented. Computer system 300 includes memory 305, processor 310, bus 315, and telephone interface card 320. As shown in FIG. 3, memory 305 includes telephone message storage driver 325, message storage 330, message delivery database 335, and interactive telephonic message delivery driver 340. Telephone message storage driver 325 performs the steps of one of the prior art methods for creating audio voice messages (such as the steps disclosed by U.S. Pat. No. 5,146,487 issued to Bergsman et al.) to enable callers to store telephonic audio messages in message storage 330. Furthermore, for each stored audio message, telephonic message storage driver 325 creates an administrative call record in message delivery database 335 and links this call record to the corresponding stored audio message.

In addition, interactive telephonic message delivery driver 340 of memory 305 initiates a contact of an intended recipient of a voice message and provides him or her with a number of options for processing the message (e.g., provides the recipient with a number of options as to when he or she wishes to hear the message). More specifically, in one embodiment of the present invention, interactive telephonic message delivery driver 340 performs the steps of the flowchart of FIG. 1. In an alternative embodiment of the present invention, interactive telephonic message delivery driver 340 performs the steps of the flowchart of FIG. 2.

As further shown in FIG. 3, computer system 300 also includes processor 310, which couples to memory 305 through bus 315 and which executes the instructions stored in memory 305. Computer system 300 also includes telephone interface card 320, which couples computer system 300 to telephone user 350 via telephone network 355. More specifically, telephone interface card 320 includes converter 345 which couples computer systems 300 to telephone user 350 (1) by converting the audio signals it receives from telephone user 350 to digital signals that it supplies to bus 315, and (2) by converting the digital signals that it receives from bus 315 to audio signals that it supplies to user 350.

One of ordinary skill in the art would recognize that the above-described invention may be embodied in other specific forms without departing from the spirit or the essential characteristics of the disclosure. For instance, in alternative embodiments of the present invention, when the recipient does not select among a number of options, the interactive message delivery system selects alternative choices as the recipients response. For example, in an alternative embodiment of the present invention, if the recipient does not select among the three options presented at step 125 or the two options presented at step 150 of FIG. 1, the message delivery system informs the recipient of a toll-free number that he or she may use at a more convenient time in order to retrieve the pending message. Thus, while certain exemplary embodiments have been described and shown in the accompanying drawings, the invention is not to be limited by the foregoing illustrative details but rather is to be defined by the appended claims.

What is claimed is:

1. An interactive telephonic message delivery method comprising the step of providing an intended recipient of a voice message with a plurality of time and place delivery options for processing said message after calling said intended recipient at an appointed date and time, wherein said recipient selects a particular option by pressing a telephone touch-tone button associated with said particular option.

2. An interactive telephonic message delivery method comprising the step of providing an intended recipient of a voice message with options for processing said message after calling said intended recipient at an appointed date and time, wherein said recipient selects a particular option by pressing a telephone touch-tone button associated with said particular option, and wherein said step of providing said recipient with said plurality of options for processing said message comprises:

(a) instructing said recipient to press a first button to listen to said message;

(b) instructing said recipient to press a second button to receive a telephone number for later retrieving said message; and (c) instructing said recipient to press a third button to end said telephone call and to receive another telephone call within a second predetermined amount of time.

3. The interactive telephonic message delivery method of claim 2, wherein, if said recipient presses said first button, said method further comprises the step of delivering said message.

4. The interactive telephonic message delivery method of claim 3, wherein, if said recipient presses said second button, said message delivery method further comprises the steps of:

(a) informing said recipient of said telephone number for later retrieving said message;

(b) providing said recipient with instruction to follow when calling to retrieve said message; and (c) changing a call record of said message to indicate that said recipient will retrieve said message.

5. The interactive telephonic message delivery method of claim 4, wherein, if said recipient selects said third button, said method further comprises the steps of:

(a) ending said telephone call;

(b) recording a new message delivery date and time in said call record, wherein said new message delivery date and time corresponds to said appointed date and time plus said second predetermined amount of time; and (c) calling said recipient at said new message delivery date and time.

6. An interactive telephonic message delivery method for providing an intended recipient of a voice message with options for processing said message after calling said intended recipient at an appointed date and time, said method comprising the steps of:

(a) requesting said recipient to generate a recognizable tone by pressing any one of telephone touch-tone buttons;

(b) if a recognizable tone is not received before a first predetermined amount of time expires,
informing said recipient of a telephone number to dial from a touch-tone telephone in order to retrieve the pending message, and
ending the telephone call; and (c) if a recognizable tone is received before the expiration of said first predetermined amount of time, providing said recipient with a plurality of options for processing said message, wherein said recipient selects a particular option by pressing a telephone touch-tone button associated with said particular option.

7. The interactive telephonic message delivery method of claim 6, wherein said step of providing said recipient with said plurality of options for processing said message comprises:

(a) instructing said recipient to press a first button to listen to said message;

(b) instructing said recipient to press a second button to receive said telephone number for later retrieving said message; and (c) instructing said recipient to press a third button to end said telephone call and to receive another telephone call within a second predetermined amount of time.

8. The interactive telephonic message delivery method of claim 7, wherein, if said recipient presses said first button, said method further comprises the step of delivering said message.

9. The interactive telephonic message delivery method of claim 8, wherein, if said recipient presses said second button, said message delivery method further comprises the steps of:

(a) informing said recipient of said telephone number for later retrieving said message;

(b) providing said recipient with instruction to follow when calling to retrieve said message; and (c) changing a call record of said message to indicate that said recipient will retrieve said message.

10. The interactive telephonic message delivery method of claim 9, wherein, if said recipient selects said third button, said method further comprises the steps of:

(a) ending said telephone call;

(b) recording a new message delivery date and time in said call record, wherein said new message delivery date and time corresponds to said appointed date and time plus said second predetermined amount of time; and (c) calling said recipient at said new message delivery date and time.

11. An interactive telephonic message delivery apparatus comprising means for providing an intended recipient of a voice message with a plurality of time and space delivery options for processing said message after calling said intended recipient at an appointed date and time, wherein said recipient selects a particular option by pressing a telephone touch-tone button associated with said particular option.

12. An interactive telephonic message delivery apparatus comprising means for providing an intended recipient of a voice message with options for processing said message after calling said intended recipient at an appointed date and time, wherein said recipient selects a particular option by pressing a telephone touch-tone button associated with said particular option, and wherein said means for providing said recipient with said plurality of options for processing said message comprises:

(a) means for instructing said recipient to press a first button to listen to said message;

(b) means for instructing said recipient to press a second button to receive a telephone number for later retrieving said message; and (c) means for instructing said recipient to press a third button to end said telephone call and to receive another telephone call within a second predetermined amount of time.

13. The interactive telephonic message delivery apparatus of claim 12, wherein, if said recipient presses said first button, said apparatus further comprises means for delivering said message.

14. The interactive telephonic message delivery apparatus of claim 13, wherein, if said recipient presses said second button, said message delivery apparatus further comprises:

(a) means for informing said recipient of said telephone number for later retrieving said message;

(b) means for providing said recipient with instruction to follow when calling to retrieve said message; and (c) means for changing a call record of said message to indicate that said recipient will retrieve said message.

15. The interactive telephonic message delivery apparatus of claim 14, wherein, if said recipient selects said third button, said apparatus further comprises:

(a) means for ending said telephone call;

(b) means for recording a new message delivery date and time in said call record, wherein said new message delivery date and time corresponds to said appointed date and time plus said second predetermined amount of time; and (c) means for calling said recipient at said new message delivery date and time.

* * * * *